United States Patent
Moromisato et al.

(10) Patent No.: US 8,959,248 B2
(45) Date of Patent: Feb. 17, 2015

(54) PERSONAL COMPUTING ENVIRONMENT WITH VIRTUAL COMPUTING DEVICE

(75) Inventors: George P. Moromisato, Seattle, WA (US); Raymond E. Ozzie, Seattle, WA (US); Noah Edelstein, Medina, WA (US); Abhay Parasnis, Sammamish, WA (US); Raymond E. Endres, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 890 days.

(21) Appl. No.: 12/036,085

(22) Filed: Feb. 22, 2008

(65) Prior Publication Data

US 2009/0216908 A1 Aug. 27, 2009

(51) Int. Cl.
*G06F 15/16* (2006.01)
*H04L 29/08* (2006.01)

(52) U.S. Cl.
CPC ...... *H04L 67/1095* (2013.01); *H04L 29/08846* (2013.01)
USPC ........... 709/248; 709/203; 709/224; 709/229; 370/341; 370/401

(58) Field of Classification Search
CPC ................. H04L 67/1095; H04L 29/08846; G06F 15/173
USPC .......... 709/217–221, 248, 203, 229; 370/341, 370/401
See application file for complete search history.

(56) References Cited

U.S. PATENT DOCUMENTS

| | | | |
|---|---|---|---|
| 5,987,506 A | 11/1999 | Carter et al. | |
| 6,311,209 B1 | 10/2001 | Olson et al. | |
| 6,549,917 B1 * | 4/2003 | Pollard et al. | 707/201 |
| 6,871,220 B1 | 3/2005 | Rajan et al. | |
| 7,076,504 B1 | 7/2006 | Handel et al. | |
| 7,143,443 B2 | 11/2006 | Song et al. | |
| 7,230,940 B2 * | 6/2007 | Fantaske | 370/338 |
| 7,240,094 B2 | 7/2007 | Hackney et al. | |
| 7,292,588 B2 * | 11/2007 | Milley et al. | 370/401 |
| 7,552,189 B2 * | 6/2009 | Mehra | 709/215 |
| 7,796,572 B2 * | 9/2010 | Do et al. | 370/338 |

(Continued)

FOREIGN PATENT DOCUMENTS

EP 1132847 A2 * 9/2001 .............. G06F 17/60

OTHER PUBLICATIONS

Hilbert, et al., "Personalizing shared ubiquitous devices," Dated Jan. 14, 2004, pp. 1-14.

(Continued)

*Primary Examiner* — Razu Miah
(74) *Attorney, Agent, or Firm* — Bryan Webster; Kate Drakos; Micky Minhas

(57) ABSTRACT

Systems and methods of providing synchronization of providing a device mesh and a virtual computing device are disclosed herein. A selection of a plurality of computer devices, such as PDAs, cellphone, laptops, and the like, can be received from a user. The data at the virtual computing device and the plurality of devices can be synchronized. Access to all applications available in each computing device in the plurality of computing devices can be provided at the virtual computing device. Access to all data available in each computing device in the plurality of computing devices can be provided at the virtual computing device. Access to the virtual computing device can be provided via a data network.

20 Claims, 7 Drawing Sheets

(56) References Cited

U.S. PATENT DOCUMENTS

| | | | |
|---|---|---|---|
| 7,930,270 B2 * | 4/2011 | Tsang | 707/610 |
| 8,046,719 B2 * | 10/2011 | Skourup et al. | 715/848 |
| 2002/0004835 A1 * | 1/2002 | Yarbrough | 709/230 |
| 2002/0029258 A1 * | 3/2002 | Mousseau et al. | 709/218 |
| 2002/0065946 A1 * | 5/2002 | Narayan | 709/315 |
| 2002/0112078 A1 * | 8/2002 | Yach | 709/246 |
| 2002/0186676 A1 * | 12/2002 | Milley et al. | 370/341 |
| 2003/0016672 A1 * | 1/2003 | Rosen et al. | 370/392 |
| 2003/0043763 A1 * | 3/2003 | Grayson | 370/329 |
| 2003/0084104 A1 * | 5/2003 | Salem et al. | 709/205 |
| 2003/0208524 A1 * | 11/2003 | Morman et al. | 709/201 |
| 2003/0211852 A1 * | 11/2003 | Vidaillac | 455/456.1 |
| 2004/0031058 A1 | 2/2004 | Reisman | |
| 2004/0044728 A1 * | 3/2004 | Gargi | 709/203 |
| 2004/0139157 A1 * | 7/2004 | Neely et al. | 709/205 |
| 2004/0172446 A1 * | 9/2004 | Dorman et al. | 709/203 |
| 2004/0181574 A1 * | 9/2004 | Hanhan | 709/202 |
| 2004/0205357 A1 | 10/2004 | Kuo et al. | |
| 2005/0144195 A1 * | 6/2005 | Hesselink et al. | 707/201 |
| 2005/0149481 A1 * | 7/2005 | Hesselink et al. | 707/1 |
| 2005/0160176 A1 * | 7/2005 | Seales et al. | 709/229 |
| 2006/0003777 A1 * | 1/2006 | Nonoyama et al. | 455/457 |
| 2006/0095525 A1 * | 5/2006 | Mousseau et al. | 709/206 |
| 2006/0161272 A1 * | 7/2006 | Haller et al. | 700/29 |
| 2006/0265711 A1 | 11/2006 | Bantz et al. | |
| 2006/0294242 A1 * | 12/2006 | Ozaki et al. | 709/227 |
| 2007/0011334 A1 * | 1/2007 | Higgins et al. | 709/227 |
| 2007/0036099 A1 * | 2/2007 | Maria et al. | 370/328 |
| 2007/0094325 A1 * | 4/2007 | Ih et al. | 709/203 |
| 2007/0112944 A1 * | 5/2007 | Zapata et al. | 709/221 |
| 2007/0124382 A1 * | 5/2007 | Hughes | 709/205 |
| 2007/0150810 A1 * | 6/2007 | Katz et al. | 715/526 |
| 2007/0180447 A1 * | 8/2007 | Mazzaferri et al. | 718/1 |
| 2007/0234356 A1 | 10/2007 | Martins et al. | |
| 2007/0260702 A1 * | 11/2007 | Richardson et al. | 709/217 |
| 2008/0155058 A1 * | 6/2008 | Prasad et al. | 709/218 |
| 2008/0256174 A1 * | 10/2008 | Toivonen | 709/203 |
| 2008/0313550 A1 * | 12/2008 | Shiga et al. | 715/753 |
| 2009/0138139 A1 * | 5/2009 | Tsai et al. | 701/3 |
| 2009/0265464 A1 * | 10/2009 | Jakobson | 709/224 |
| 2010/0215024 A1 * | 8/2010 | Chiang | 370/338 |
| 2010/0257589 A1 * | 10/2010 | Zhao | 726/3 |

OTHER PUBLICATIONS

Helal et al., "UbiData: Requirements and Architecture for Ubiquitous Data Access," Dated Dec. 2004 pp. 1-6.

* cited by examiner

PERSONAL COMPUTING ENVIRONMENT WITH VIRTUAL COMPUTING DEVICE

BACKGROUND

A wide variety of synchronization systems exist that synchronize data between different endpoints, such as between different computing devices. As the prevalence of technology increases consumers use more and more devices to stay in touch with their data, applications, and contacts. Today, many users have multiple computers, a cell phone, a music device, and the like. Web based applications are also popular and users may frequent multiple applications on the World Wide Web. As the breadth of this personal computing environment gets wider users have to separately manage the information in each of the computing devices, and at times access applications from different devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various techniques and technologies directed to providing a virtual computing device in a device mesh, as well as a backend system to support the device mesh. The virtual computing device can be part of a mesh of devices that are synchronized to each other and to the virtual computing device. Applications and data are ubiquitously accessible and synchronized through any of the computing devices of the mesh.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
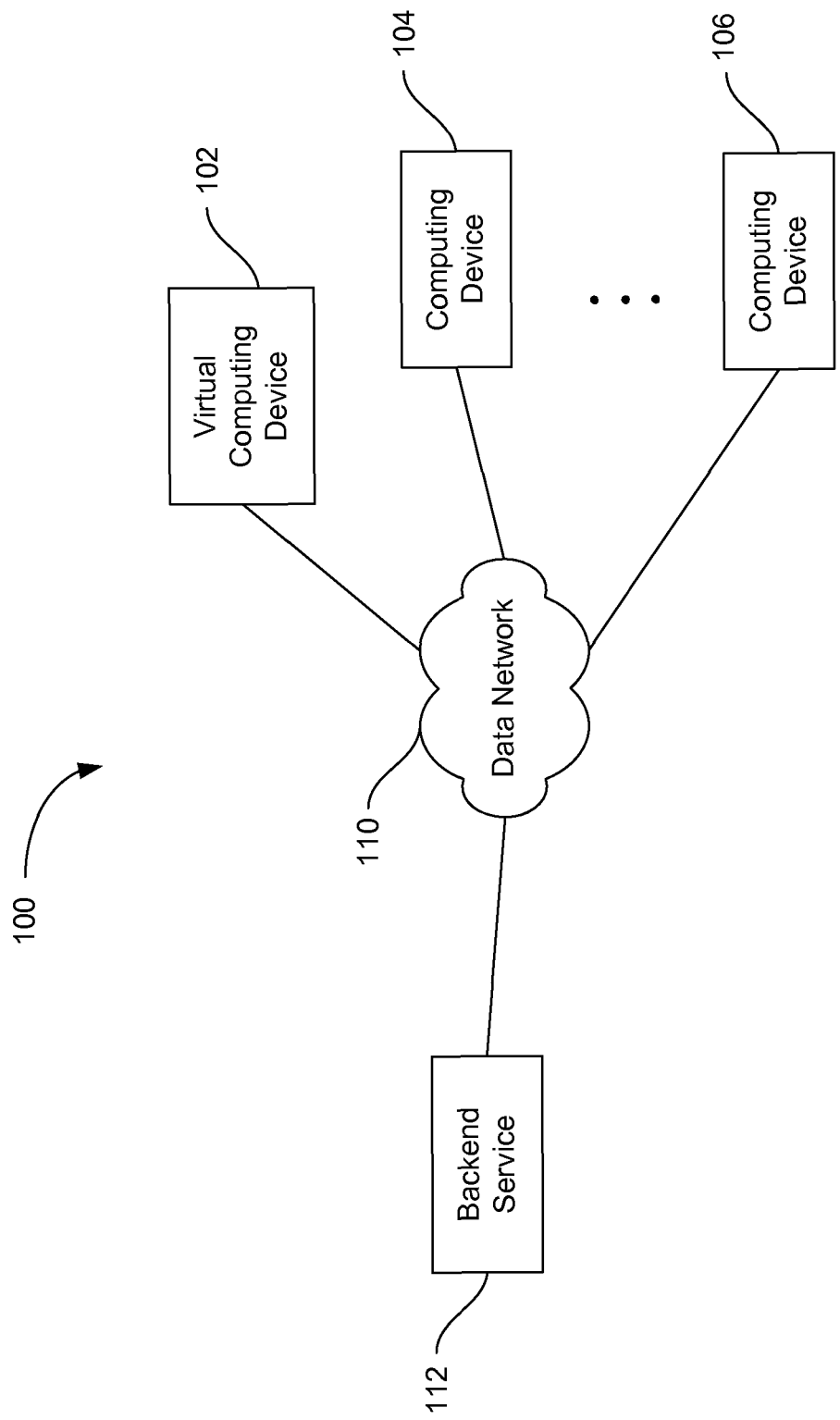
FIG. 1 illustrates a component diagram of a system for providing a device mesh according to one embodiment.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The system described is provided as an example and not a limitation. As those skilled in the art will appreciate, the present examples are suitable for application in a variety of different types of synchronization of postings.

Described herein are various techniques and technologies directed toward an implementation of a virtual computing device as part of a device mesh. As used herein, a device mesh is a collection of one or more devices that are interconnected. In one embodiment, the device mesh works as a computing environment for a user. At least one of the devices in the mesh of devices can be a virtual computing device. The virtual computing device can have device properties like all of the other computing devices in the mesh, run applications, store and retrieve data, and so on.

The device mesh can provide to the user multiple points to access the same data and applications. As such, each computing device in the device mesh can have the same data available to the user. To accomplish this, each device can have the data replicated locally, or have a reference to storage location of the data. Furthermore, the user interface for each computing device in the device mesh can be similar in order to allow the user to have a similar experience in any of the devices accessed by the user.

The device mesh makes it easier to connect to data, applications, and people by creating a "mesh" of the devices that that the user accesses frequently. The device mesh can include physical devices, such as your computers and cell phone. The device mesh can also include a unique device, a virtual computing device that ensures that the user can access your information, applications, and friends from any web browser.

The virtual computing device shares many characteristics with the other devices in a device mesh. The virtual computing device synchronizes the user's data. Data made available to the devices in the users mesh can be stored and accessed online via the virtual computing device. The virtual computing device can run applications, have a familiar user interface, and can provide APIs so that new applications can be developed for the virtual computing device. Furthermore, the virtual computing device can also have some unique characteristics that add value to the device mesh. The virtual computing device can be ubiquitously accessible via a web browser. The virtual computing device can be always on, be secure, and have data backed up. In one embodiment, all of the data and applications can be aggregated in the device mesh and accessible in all devices in the device mesh, including the virtual computing device.

FIG. 1 illustrates a component diagram of a system for providing a device mesh according to one embodiment. In the exemplary system 100 data may be synchronized and shared among all the computing devices. The device mesh can include a virtual computing device 102, computing device 104, and computing device 106, as well as the exemplary data network 110. In one example, computing device 102, computing device 104, and computing device 106 are peer computers that transmit and receive data via the data network 110. Generally, a sharing or synchronization relationship may exist between two or more computing devices in the device mesh. A particular sharing relationship can relate to a data set comprising one or more data items. When new data is entered at one computing device, the new data might be synchronized to the other computing devices in the synchronization relationship.

In one example, where two computing devices, such as virtual computing device 102 and computing device 104, are in a sharing relationship, both computing devices publish and subscribe. In one embodiment, each computing device may create "local" data that to another computing device via a synchronization operation as described below. In another example, each computing device can be configured to upload data to the backend service 112.

In one example, virtual computing device 102 (or computing device 104 or some other computing device including those not shown) might participate in a sharing or synchronization relationship with the rest of the computing devices in the mesh. Virtual computing device 102 may store documents or any other data. As such, a user at the virtual computing device 102 can add a data associated to a document, file, folder, or any other file system item, and such data can then be propagated to computing device 104 and computing device 106. In this manner, the user can have the recently added data item available at all of his devices that are part of the mesh as well as the virtual computing device 102. For instance, if the user has a portable data assistant (PDA) and a laptop, the data item added to the virtual computing device can be accessible through any of the other two devices. Likewise, the user can access the virtual computing device 102 through ubiquitous access points. For example, the virtual computing device 102 can be configured to be accessed via a web browser.

Computing device 102 and computing device 106 are shown in the system 100 as being connected by an exemplary data network 110. Such an exemplary communications means should be interpreted as including any means by which data may be transmitted, including any type of network or any other kind of transfer, including the transfer of physical media, like a compact disc (CD) or flash memory drive. Computing devices might also be connected directly, such as might be illustrated, for example, by the connection between computing device 102 and computing device 104.

The information that is shared and synchronized between computing devices may be stored in a variety of manners and locations. In at least one implementation, a computing device might store synchronized data locally on the same computing device or remotely on one or more other computing devices. Such storage may in some cases be embodied by one or more disk drives or magnetic or other storage devices, or by any other mechanism by which data may be stored. When some or all of the synchronized data is accessed remotely, the data may be accessed, for example, using a network or other communication means.

While synchronization of data may be implemented in a wide variety of fashions and using a variety of techniques and technologies, in at least some implementations, synchronization of data may be implemented, at least in part, by the addition of particular data to a feed of data provided using a possibly widely accepted protocol like RSS ("Really Simple Syndication" or "Rich Site Summary") or ATOM. For example, in an exemplary implementation with a topology that consists of only two computing devices that communicate with each other, a publisher—such as perhaps computing device 102, in at least one example—might publish an RSS or Atom feed that contains some type or types of information. In perhaps one example, the feed might include data representing directories and files. In yet another example, the feed might represent, contain, or reference any other data.

A computing device that is part of the device mesh, such as perhaps computing device 106 in one example, might be added to the mesh be notified when, for example, the another computing device in the device mesh adds a new file, modifies an existing file, and so on.

In at least some implementations, the synchronization information in a feed, and the processes to be followed by at least particular computing devices when updating data, may be the same as or similar to those associated with a protocol such as "Simple Sharing Extensions" (SSE). SSE may be understood generally as defining extensions to—or additional data to be used with—feed protocols like RSS and Atom, or other feed protocols or documents, where the extensions relate to information that may be used when transferring or synchronizing data using a feed. In some cases, an RSS, Atom, or other type of feed that includes SSE information may be referred to as an "SSE feed."

Each computing device shown in this system might represent any number of general-purpose or dedicated computers, including desktop computers, server computers, laptop computers, workstation computers, mobile or cellular telephones, connected personal digital assistants (PDAs), and the like. In at least some implementations, a computing device may be implemented by a computing environment including the exemplary computing environment discussed below with reference to FIG. 5.

Figure 2:
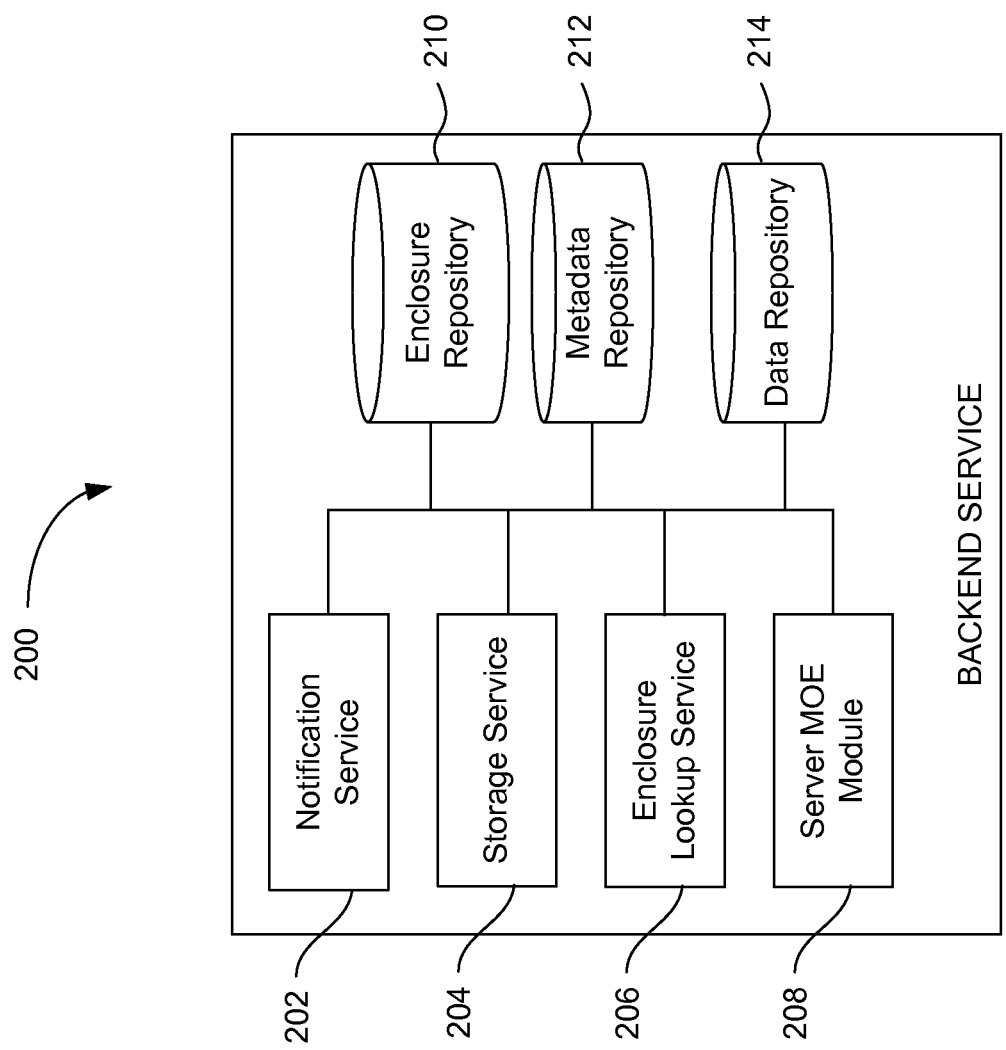
FIG. 2 illustrates a component diagram of a backend service configured to interact with a device mesh according to one embodiment.

FIG. 2 illustrates a component diagram of a backend service configured to interact with a device mesh according to one embodiment. The back end service 200 can include among other software modules, a notification service 202, a storage service 204, an enclosure lo lookup service 206, and a server mesh operating environment (MOE) module 208. In addition, various data repositories such as enclosure repository 210, metadata repository 212, and data repository 214 can also be included as part of the computer infrastructure of the backend service 200.

The server mesh operating environment module 208 can be configured to interact with a client mesh operating environment module of at least one computing device of a plurality of computing devices. The plurality of computing devices can be part of a device mesh.

The server MOE module 208 in combination with one or more client MOE modules can be implemented to form a mesh operating environment layer. The MOE layer can be used to allow applications to run in without regard to whether the application is actually running in one of the computing devices, the virtual computing device, or on a computer associated with the backend service 200.

Furthermore, the storage service 204 can be configured to store metadata corresponding to all data of devices in the device mesh. The storage service 204 can be configured to store the metadata corresponding to the devices in the device mesh. In one example, the metadata includes a list of files that is stored in all of the devices in the device mesh. This list can be synchronized using data feeds (e.g., Simple Sharing Extensions (SSE) feeds).

In addition, the enclosure lookup service 204 can be configured to provide a reference to a location of where the data is stored within the device mesh. In one instance, each file or data item can be associated with a memory location, which in turn can be stored in the enclosure lookup service. Thus, for each data item there is a pointer where the actual data is stored. Of course the data item can be stored in any one of the computing devices or the backend service 200. The enclosure lookup service 206 is configured to indicate where the actual data is located. For example, what device, or where in the data network. The enclosure lookup service 204 can provide enclosure lookup APIs that can be used by a computing device to request the location of a data item. As such, the enclosure lookup service 204, upon receiving a request for a location of a file, can be configured to lookup the location of a requested file or data item, and provide such location in response to the request.

The notification service 202 can be configured to notify to all the devices in the device mesh about data changes in a computing device. As mentioned above, the notification service 202 can indicate to the computing devices in the device mesh that a new document was added. The computing devices can use SSE feeds to pull down the metadata and synchronize the data (or metadata) stored at the computing devices.

The server MOE module 208 can also include core objects APIs that are used to change and edit data items, such as files. In one example, a user can access a computing device at work that is part of a device mesh. The user can add a large document to the computing device. The computing device can be configured to utilize the core object APIs to add the document to the device mesh vie the client MOE module which in turn communicates with the server MOE module 208. Furthermore, enclosure APIs can be utilized to store pointer information of the location of the data item. The notification service 202 can then receive a notification from the server MOE 208 of the newly added document. The notification service 202 can then submit notifications to all of the computing devices in the mesh of the new document. The computing devices can then update the stored information regarding the data available to the user.

Later, if a computing device in the device mesh wants the file, the location of the file can be obtained from the enclosure lookup service, and then request the actual data from the location provided by the enclosure service 206.

In one embodiment, the file can be stored locally, and metadata corresponding to the file can be stored in each of the computing devices in the device mesh, and in the back end service 200. In another embodiment, the file can also be stored in a data repository 210 in the backend service 200. In yet another embodiment, the data is stored locally in the computing device, or at another location in the data network according to algorithms used for storing data items in the device mesh.

Furthermore, the backend service 200 can also include one or more data repositories. For example, the backend service can include an enclosure repository 210, a metadata repository 212 and a data repository 214. The enclosure repository 210 can be accessed by the enclosure lookup service 206 in order to access pointers of data within device mesh. Furthermore, the storage service 204 can utilize the metadata repository 212 to store metadata of data items stored within the device mesh, and to store data items locally in data repository 214.

Figure 3:
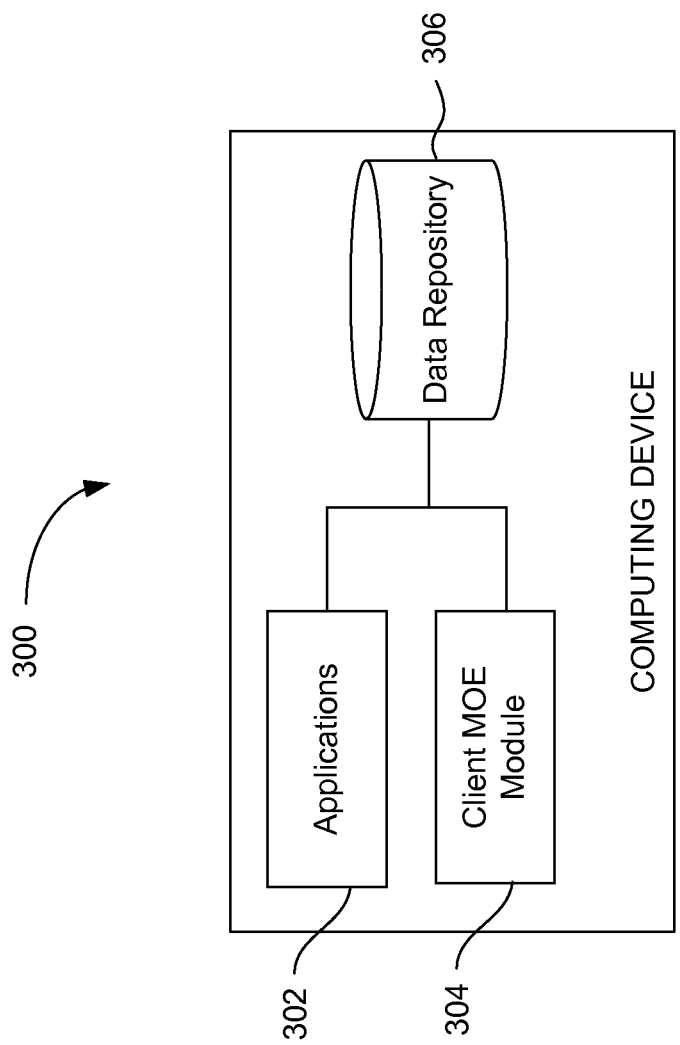
FIG. 3 illustrates a component diagram of a computing device according to one embodiment.

FIG. 3 illustrates a component diagram of a computing device according to one embodiment. As disclosed herein, the computing device 300 can be a virtual computing device, or a conventional computing device. Furthermore, the computing device 300 can be representative of each computing device in the device mesh. As such, the computing device 300 can include one or more applications 302 that can be run locally or remotely form another computing device in the device mesh. In addition, the computing device 300 can be configured with a client MOE module 304 that permits the communication of data with the server MOE module 304 thereby permitting the computing device 300 to operate as part of the device mesh. In addition, the computing device 300 can also include a data repository 306. The computing device 300 can utilize the data repository 306 to store data and metadata locally. As such, data stored locally can be accessed by other peer devices in the device mesh. In addition, metadata stored in the data repository 306 can be used by the computing device 300 to access data stored in other computing devices of the device mesh.

Figure 4:
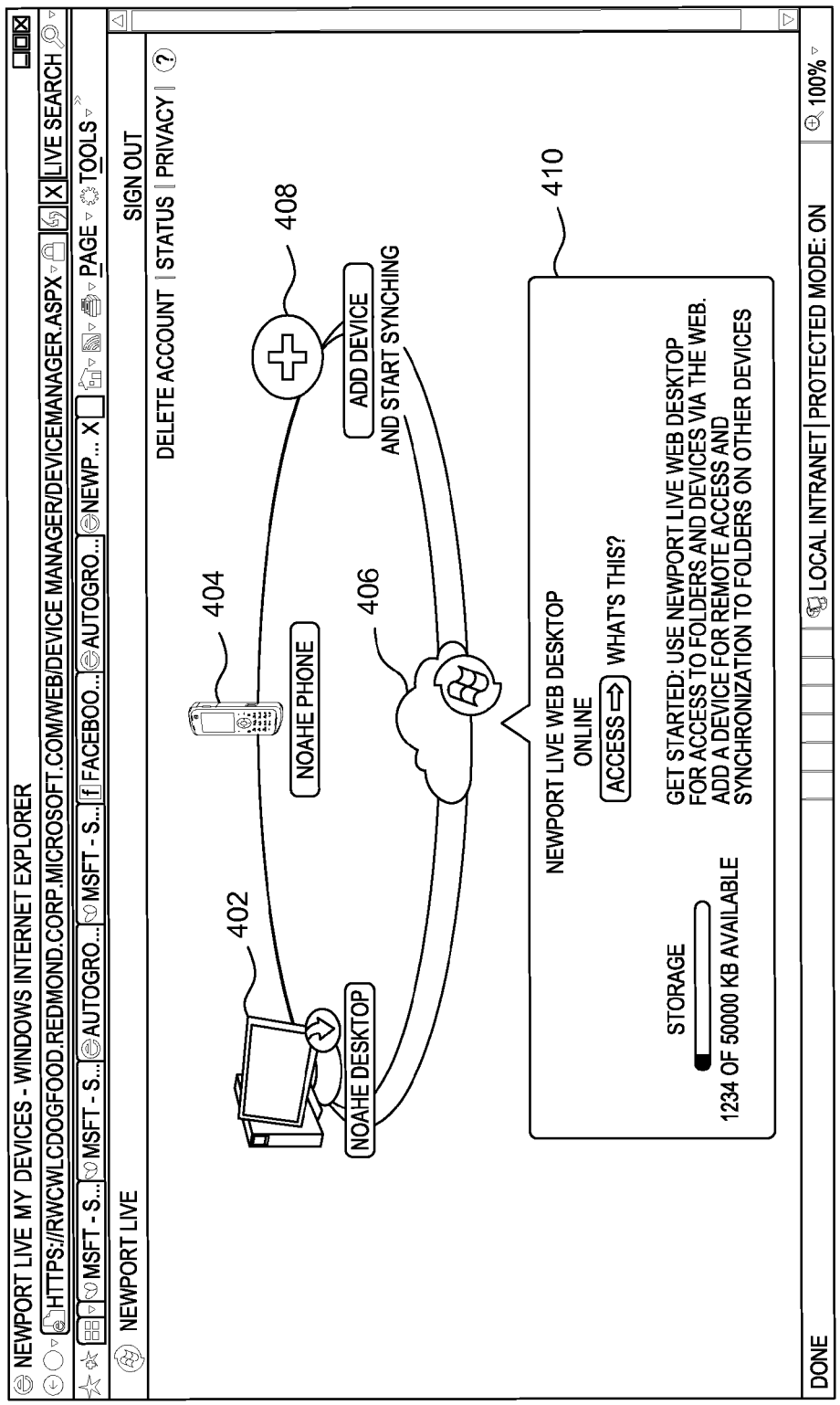
FIG. 4 illustrates an exemplary user interface diagram for viewing and managing a device mesh according to one embodiment.

FIG. 4 illustrates an exemplary user interface diagram for viewing and managing a device mesh according to one embodiment. The user interface 400 shows a list of computing devices including computing device 402, computing device 404, and the virtual computing device 406. In addition, a button 408 can be provided to add another computing device to the device mesh. User interface 400 allows a user to manage the mesh of devices by adding or deleting devices. In addition, user interface 400 permits a user to access any one of the computing devices in the device mesh. Furthermore, in one implementation, the user can be provided with a description of a computing device upon the user hovering over the representation of the device in the user interface 400.

Figure 5:
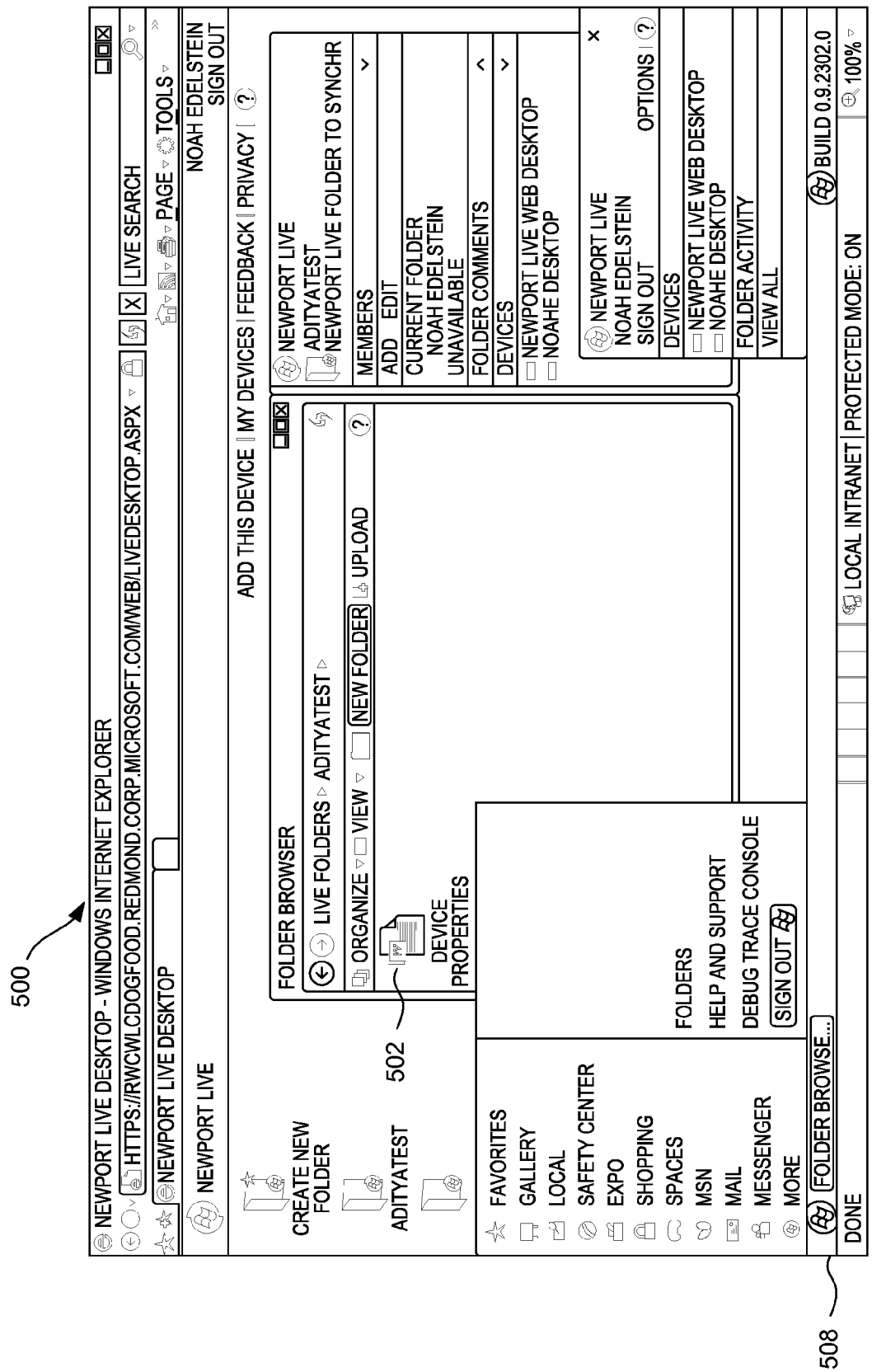
FIG. 5 illustrates an exemplary user interface diagram for viewing and managing a virtual peer computer according to one embodiment.

FIG. 5 illustrates an exemplary user interface diagram for viewing and managing a virtual computing device according to one embodiment. User interface 500 illustrates a web browser that displays various user interface mechanisms. In one embodiment, the user interface mechanisms shown in the web browsing window can be similar to those shown in a desktop view of a Windows® operating system. For instance a start menu 504, and an explorer window 502, can be displayed for interaction with the user. In another embodiment, the user interface shown by the virtual device can have a look and feel as customized by the user.

Figure 6:
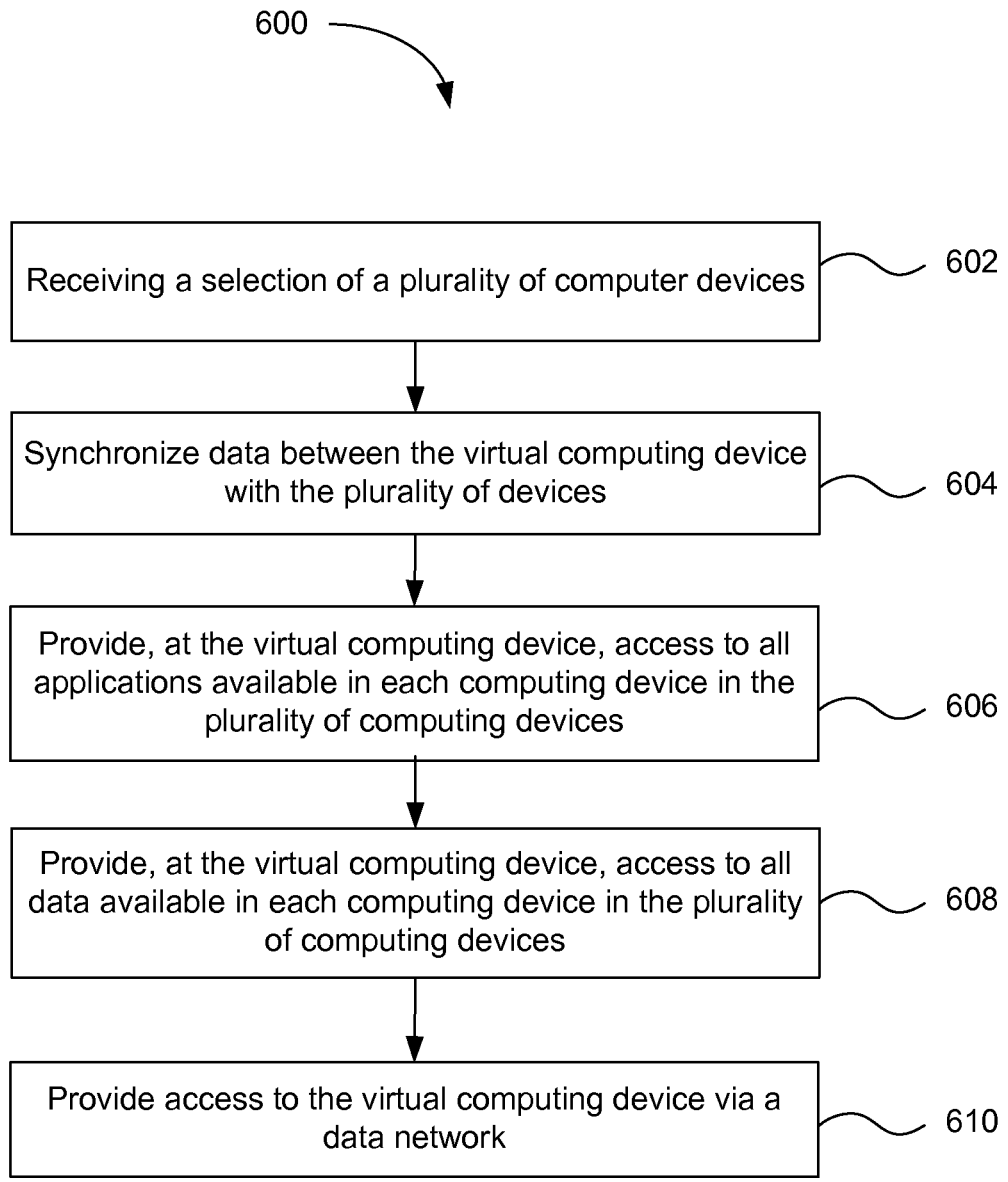
FIG. 6 illustrates a flow diagram of a process for providing a virtual computing device according to one embodiment.

FIG. 6 illustrates a flow diagram of a process for providing a virtual computing device according to one embodiment. At process block 602, a selection of a plurality of computer devices is received. Process 600 continues at process block 604. At process block 604, data between the virtual computing device with the plurality of devices is synchronized. Process 600 continues at process block 606. At process block 606, access to all applications available in each computing device in the plurality of computing devices is provided at the virtual computing device. Process 600 continues at process block 608. At process block 610, access to all data available in each computing device in the plurality of computing devices is provided at the virtual computing device. Process 600 continues at process block 612. At process block 612, access to the virtual computing device is provided via a data network.

Figure 7:
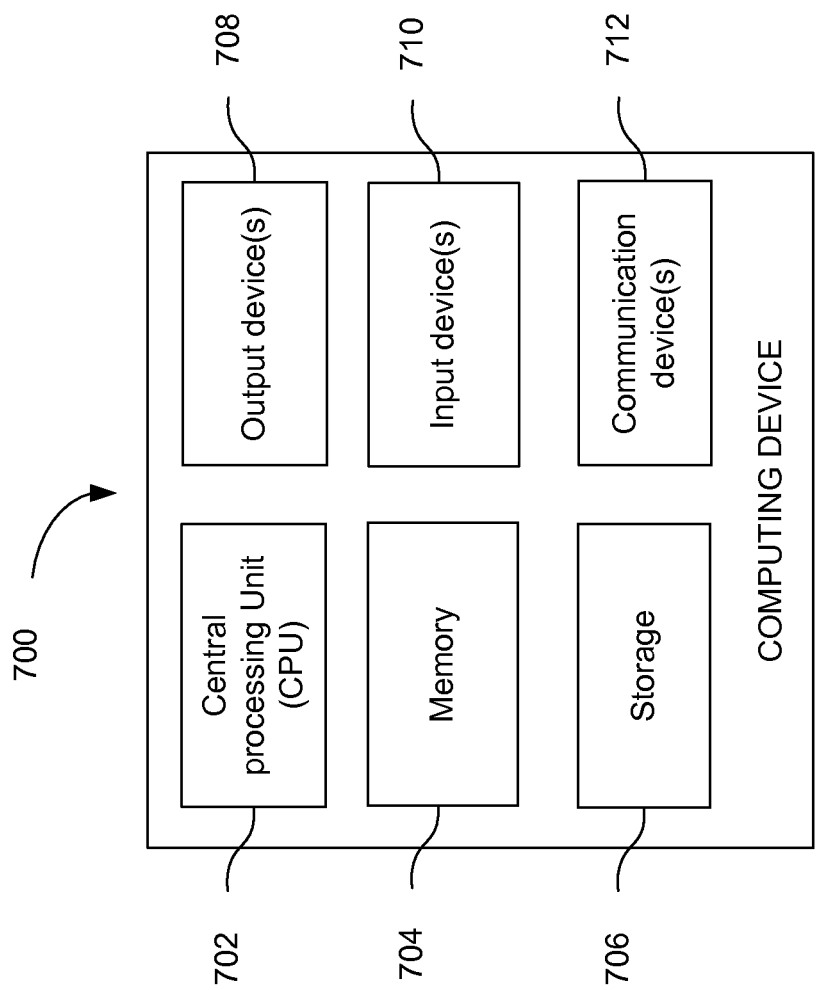
FIG. 7 illustrates a component diagram of a computing device for implementing one or more embodiments.

FIG. 7 illustrates a component diagram of a computing device for implementing one or more embodiments. The computing device 700 can be utilized to implement one or more computing devices, computer processes, or software modules described herein. In one example, the computing device 700 can be utilized to process calculations, execute instructions, receive and transmit digital signals. In another example, the computing device 700 can be utilized to process calculations, execute instructions, receive and transmit digital signals, receive and transmit search queries, and hypertext, compile computer code, as required by the synchronization module 202, the posting management module 204, and the file system module 206.

The computing device 700 can be any general or special purpose computer now known or to become known capable of performing the steps and/or performing the functions described herein, either in software, hardware, firmware, or a combination thereof.

In its most basic configuration, computing device 700 typically includes at least one central processing unit (CPU) 702 and memory 704. Depending on the exact configuration and type of computing device, memory 704 may be volatile (such as RAM), non-volatile (such as ROM, flash memory, etc.) or some combination of the two. Additionally, computing device 700 may also have additional features/functionality. For example, computing device 700 may include multiple CPU's. The described methods may be executed in any manner by any processing unit in computing device 700. For example, the described process may be executed by both multiple CPU's in parallel.

Computing device 700 may also include additional storage (removable and/or non-removable) including, but not limited to, magnetic or optical disks or tape. Such additional storage is illustrated in FIG. 7 by storage 206. Computer storage media includes volatile and nonvolatile, removable and non-removable media implemented in any method or technology for storage of information such as computer readable instructions, data structures, program modules or other data. Memory 704 and storage 706 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 700. Any such computer storage media may be part of computing device 700.

Computing device 700 may also contain communications device(s) 712 that allow the device to communicate with other devices. Communications device(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 700 may also have input device(s) 710 such as keyboard, mouse, pen, voice input device, touch input device, etc. Output device(s) 708 such as a display, speakers, printer, etc. may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method for providing access to data associated with one or more computing devices, comprising:
    defining a sharing relationship between a first computing device of the one or more computing devices and a second computing device of the one or more computing devices, the sharing relationship describing a data set that is to be shared between the first computing device and the second computing device;
    establishing a first data feed between a first client mesh operating environment module of the first computing device and a server mesh operating environment module;
    establishing a second data feed between a second client mesh operating environment module of the second computing device and the server mesh operating environment module;
    sharing the data set between the first computing device and the second computing device via at least one of the first data feed or the second data feed to generate a shared data set;
    identifying a modification to the shared data set based upon first synchronization information provided to the server mesh operating environment module from the first computing device via the first data feed; and
    notifying the second computing device of the modification to the shared data set based upon second synchronization information provided to the second computing device from the server mesh operating environment module via the second data feed, the second synchronization information providing the second computing device with access to the modification.

2. The method of claim 1, at least one of:
    the establishing a first data feed comprising establishing a first Rich Site Summary (RSS) feed; or
    the establishing a second data feed comprising establishing a second RSS feed.

3. The method of claim 1, the modification comprising at least one of:
    an addition of a new file to the shared data set; or
    a change to a file in the shared data set.

4. The method of claim 1, at least one of:
    the establishing a first data feed comprising establishing a first Simple Sharing Extensions (SSE) feed, or
    the establishing a second data feed comprising establishing a second SSE feed.

5. The method of claim 1, the first synchronization information comprising metadata corresponding to the first computing device.

6. The method of claim 1, comprising storing the modification at the server mesh operating environment module.

7. The method of claim 1, the second synchronization information comprising a device identifier identifying the first computing device.

8. The method of claim 1, comprising retrieving the modification from the first computing device responsive to the identifying.

9. The method of claim 1, the second synchronization information comprising the modification.

10. The method of claim 1, comprising providing for displaying within a user interface a feature describing the sharing relationship between the first computing device and the second computing device.

11. A tangible computer readable storage device comprising computer executable instructions that when executed perform a method for providing access to data associated with one or more computing devices, comprising:
    defining a sharing relationship between a first computing device of the one or more computing devices and a second computing device of the one or more computing devices, the sharing relationship describing a data set that is to be shared between the first computing device and the second computing device;

establishing a first data feed between a first client mesh operating environment module of the first computing device and a server mesh operating environment module;

establishing a second data feed between a second client mesh operating environment module of the second computing device and the server mesh operating environment module;

sharing the data set between the first computing device and the second computing device via at least one of the first data feed or the second data feed to generate a shared data set;

identifying a modification to the shared data set based upon first synchronization information provided to the server mesh operating environment module from the first computing device via the first data feed; and notifying the second computing device of the modification to the shared data set based upon second synchronization information provided to the second computing device from the server mesh operating environment module via the second data feed, the second synchronization information providing the second computing device with access to the modification.

12. The tangible computer readable storage device of claim 11, at least one of:
the establishing a first data feed comprising establishing a first Rich Site Summary (RSS) feed; or
the establishing a second data feed comprising establishing a second RSS feed.

13. The tangible computer readable storage device of claim 11, the modification comprising at least one of:
an addition of a new file to the shared data set; or
a change to a file in the shared data set.

14. The tangible computer readable storage device of claim 11, at least one of:
the establishing a first data feed comprising establishing a first Simple Sharing Extensions (SSE) feed, or
the establishing a second data feed comprising establishing a second SSE feed.

15. The tangible computer readable storage device of claim 11, the second synchronization information comprising a device identifier identifying the first computing device.

16. The tangible computer readable storage device of claim 11, the second synchronization information comprising the modification.

17. The tangible computer readable storage device of claim 11, the method comprising retrieving the modification from the first computing device responsive to the identifying.

18. A system for providing access to data associated with one or more computing devices, comprising:
one or more processing units; and
memory configured to store instructions that when executed by at least one of the one or more processing units perform a method, comprising:
defining a sharing relationship between a first computing device of the one or more computing devices and a second computing device of the one or more computing devices, the sharing relationship describing a data set that is to be shared between the first computing device and the second computing device;
establishing a first data feed between a first client mesh operating environment module of the first computing device and a server mesh operating environment module;
establishing a second data feed between a second client mesh operating environment module of the second computing device and the server mesh operating environment module;
sharing the data set between the first computing device and the second computing device via at least one of the first data feed or the second data feed to generate a shared data set;
identifying a modification to the shared data set based upon first synchronization information provided to the server mesh operating environment module from the first computing device via the first data feed; and
notifying the second computing device of the modification to the shared data set based upon second synchronization information provided to the second computing device from the server mesh operating environment module via the second data feed, the second synchronization information providing the second computing device with access to the modification.

19. The system of claim 18, at least one of the first computing device or the second computing device comprising a virtual computing device.

20. The system of claim 19, the virtual computing device accessible via a web browser.

* * * * *